Figure 1:
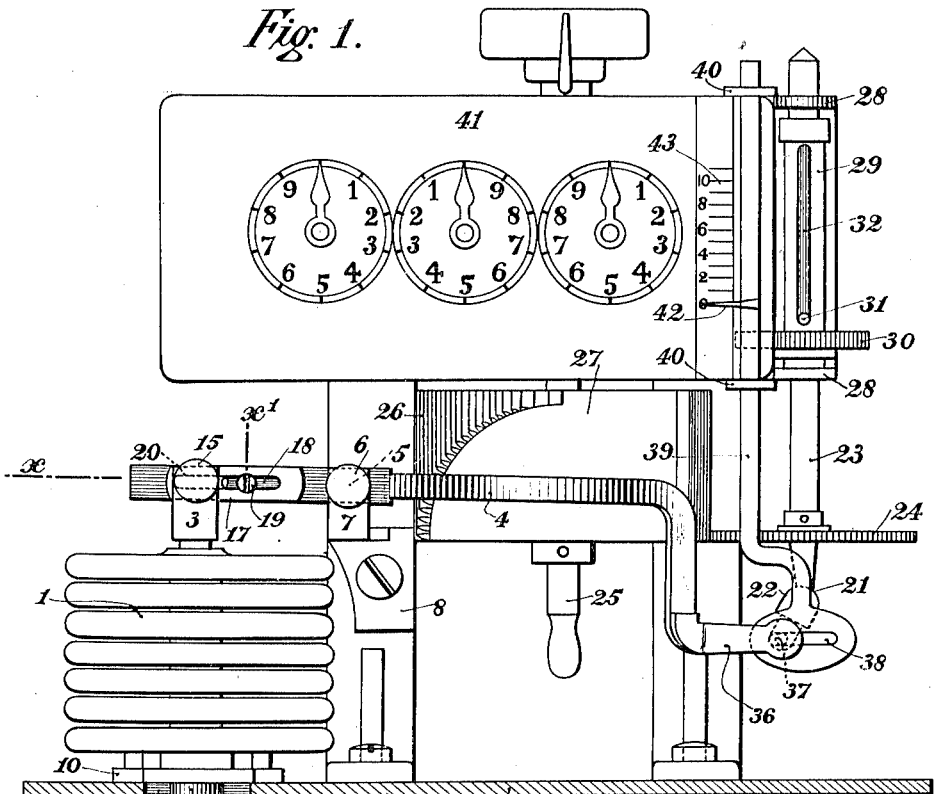

W. D. CHESHIRE & E. D. WEIPPERT.
GAS METER REGISTERING MECHANISM.
APPLICATION FILED DEC. 10, 1910.

1,012,520.

Patented Dec. 19, 1911.
4 SHEETS—SHEET 1.

WITNESSES

INVENTORS William D. Cheshire
Edmund D. Weippert
by James L. Norris Jr.
Atty

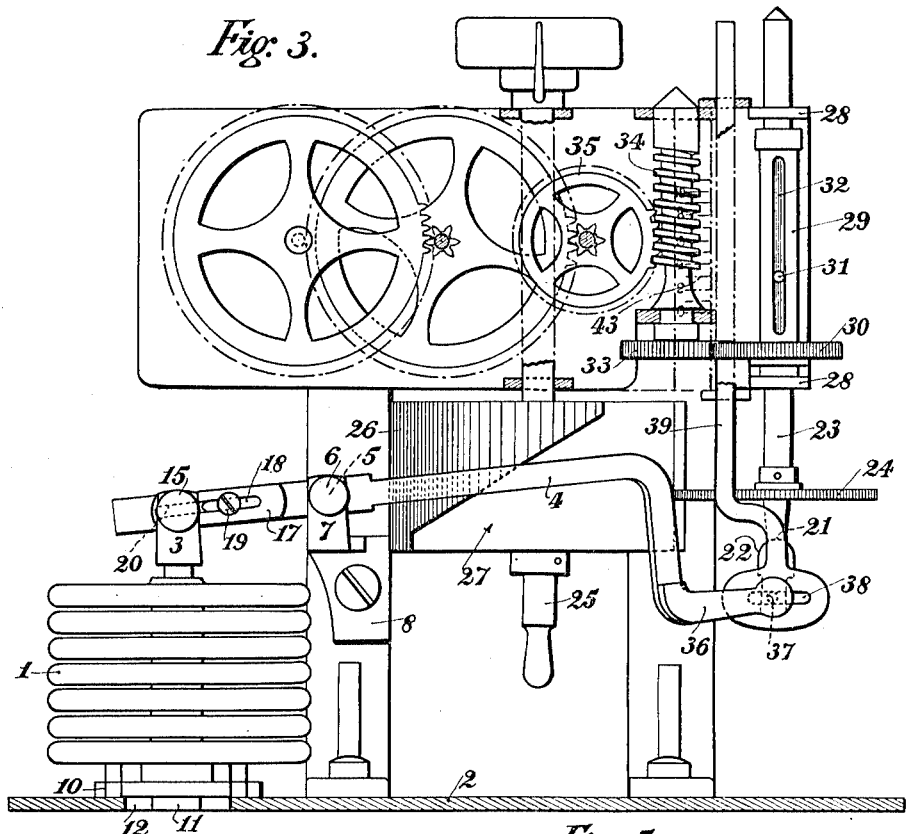
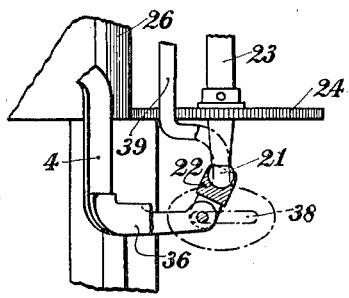
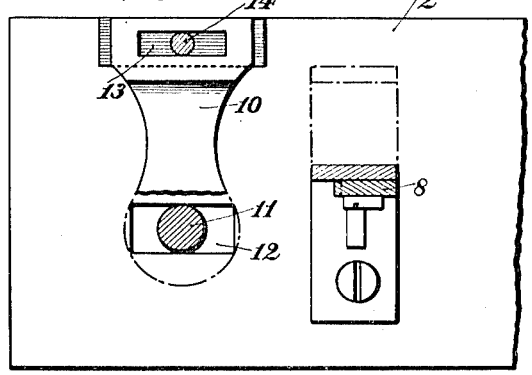

W. D. CHESHIRE & E. D. WEIPPERT.
GAS METER REGISTERING MECHANISM.
APPLICATION FILED DEC. 10, 1910.
1,012,520.
Patented Dec. 19, 1911.
4 SHEETS—SHEET 3.
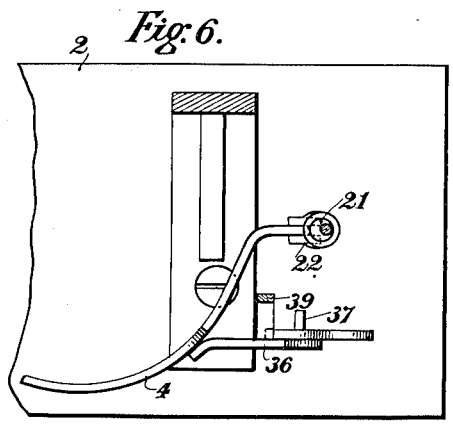
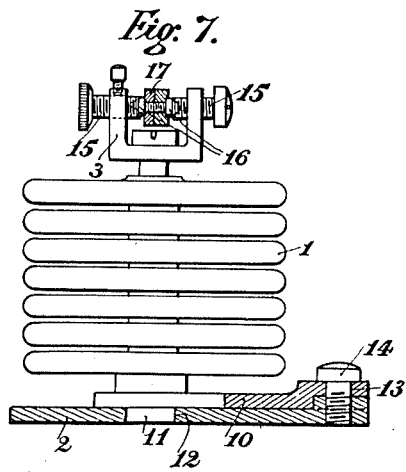
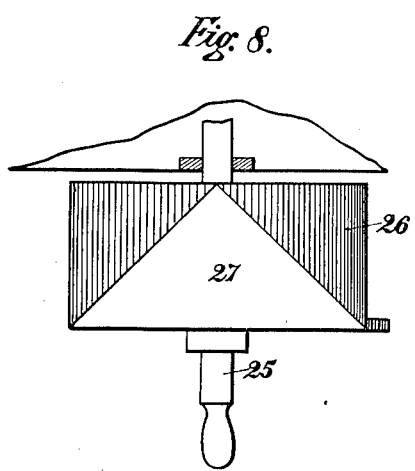
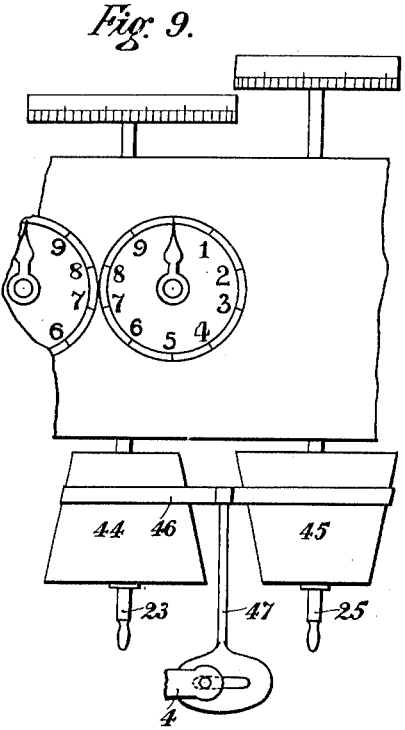
WITNESSES.
INVENTORS William D. Cheshire
Edmund D. Weippert
by James L. Norris, Jr.

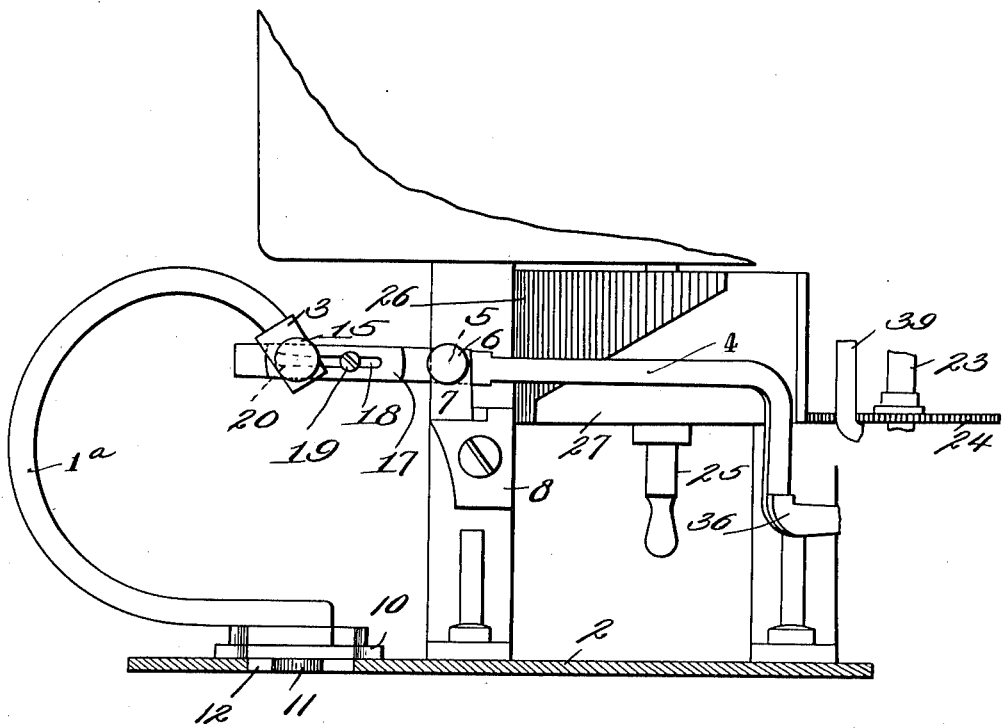

UNITED STATES PATENT OFFICE.

WILLIAM DONALD CHESHIRE AND EDMUND DOUGLAS WEIPPERT, OF BIRMINGHAM, ENGLAND, ASSIGNORS TO PARKINSON AND W. AND B. COWAN LIMITED, OF BIRMINGHAM, ENGLAND.

GAS-METER REGISTERING MECHANISM.

1,012,520.  Specification of Letters Patent.  Patented Dec. 19, 1911.

Application filed December 10, 1910. Serial No. 596,633.

*To all whom it may concern:*

Be it known that we, WILLIAM DONALD CHESHIRE and EDMUND DOUGLAS WEIPPERT, subjects of the King of Great Britain, residing at Birmingham, England, have invented certain new and useful Improvements in or Relating to Gas-Meter Registering Mechanism, of which the following is a specification.

In ordinary gas meters where the meter spindle is connected directly to the registering mechanism, the latter simply registers the revolutions of the said spindle and indicates the number of unit volumes of gas delivered, but no account is taken of the varying weight or quantity of gas contained in each such volume, which constantly fluctuates under variations of service pressure or other changing conditions of supply. Consequently, as a given volume or measure of gas will contain a proportionally greater weight when delivered under a high pressure than it will at a lower pressure, while no corresponding alteration will be made in the action of the registering mechanism, it follows that, when registering meters of the usual construction are used, increases in the supply pressure above that for which the meter is calibrated represent a loss to the seller of the gas, since during the time that the higher pressure prevails, the consumer receives a greater weight or quantity of gas than is charged to him by the registering mechanism. Again, it is impossible for an ordinary meter that is calibrated to suit one system, or one particular supply pressure, to be used for another system having a greater pressure without loss to the seller of the gas, and even when a meter is working on a system for which it has been calibrated, losses may still occur owing to temporary or unforeseen increases in the pressure.

The object of the present invention is to provide gas meters (whether of the wet or dry type) with mechanism which is interposed between the registering train and the spindle which drives the latter, and is adapted to automatically adjust or vary the registering action so as to suit the pressure at which gas is supplied to the meter and to compensate for or correct the effect of any variations or fluctuations in the supply pressure. This mechanism is controlled by the prevailing supply pressure on the system, and it operates to modify the motion transmitted from the spindle to the registering train so that when the supply pressure increases, although the rate of rotation of the spindle is not changed, and the same number of volume units pass through the meter, the action of the registering mechanism is accelerated in proportion to the rise in pressure and consequently to the increased weight or quantity of gas contained in each volume measured during the period over which the pressure increase is maintained, whereas when the pressure drops, the motion transmitted from the spindle is again modified so as to correspondingly retard the registering action.

Figure 2:
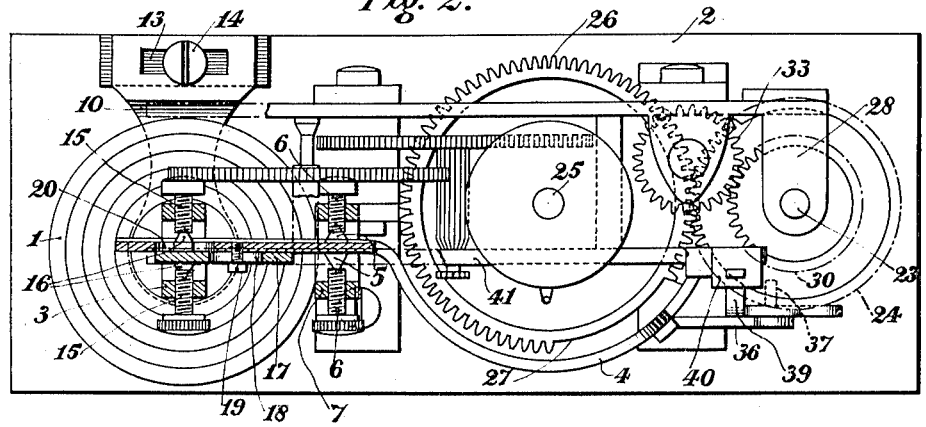

Figure 1 of the accompanying drawings represents a front elevation of the registering and compensating mechanism of a gas meter, such registering and compensating mechanism being constructed in accordance with this invention. Fig. 2 is a sectional plan partly on line $x$ Fig. 1. Fig. 3 shows the registering mechanism in sectional elevation, and illustrates how the variable compensating gearing is operated for an increase in pressure. Fig. 4 represents a view showing how the end of the rocking lever is connected to the gear wheel spindle. Fig. 5 is a horizontal section illustrating how the aneroid is adjustable along the base in order to vary the amount of movement of the lever. Fig. 6 represents a sectional plan of the end of the rocking lever showing how the connection with the gear-wheel spindle and an indicating device is made. Fig. 7 is a cross section on the line $x^1$, Fig. 1, parts being in elevation. Fig. 8 shows a modified form of compensating gear wheel that may be employed. Fig. 9 represents a modified form of compensating gear. Fig. 10 is a fragmentary side elevation showing the use of a modified form of elastic or expansible chamber.

The same reference numerals indicate corresponding parts in each of the figures of the drawings.

Referring to Figs. 1 to 8, 1 is an aneroid or elastic metal chamber carried upon a base 2. This aneroid, together with the whole of the other parts of the compensating mechanism, is inclosed within a gastight box or chamber which is connected up with the gas supply system, so that the gas acts externally upon the aneroid, whose interior is either exhausted (totally or partially) or subjected to atmospheric pressure, and causes it to expand and contract according to the fluctuations in the pressure; that is to say, when the pressure increases the aneroid contracts, whereas when the pressure decreases, it expands. The upper end of the said aneroid is adjustably connected, by the forked part 3, to one end of a rocking lever 4 fulcrumed at 5 between two adjustable screws 6 carried in a forked bracket 7 attached to the frame 8. The point of connection of the aneroid 1 with the lever 4 is adjustable, according to requirements, for which purpose the aneroid is movable along the base 2 in a longitudinal direction. Thus at its lower end it is carried upon a plate 10 provided, upon its underside, with a stud 11 engaging in a slot 12 in the base 2. The outer end of the plate 10 is provided with a slot 13 with which engages a fixing screw 14. By slackening this screw the aneroid 1 can be adjusted longitudinally to the desired position, and there fixed by again tightening up the said screw 14. At the upper end, the forked part 3 carries a pair of adjustable screws 15 whose ends are formed with recesses in which engage a pair of pivots 16 upon opposite sides of a bar or slide 17 provided with a slot 18 through which passes a screw 19 carried by the lever 4. One of the pivots 16 passes through a slot 20 in the lever, as shown in Fig. 2. By slackening the screw 19 the point of connection of the aneroid with the lever, can (by moving said aneroid longitudinally as above described) be adjusted as desired, the bar 17 moving over the screw 19, and the pivot 16 moving within the slot 20, the parts being set in their adjusted positions by again tightening up the said screw 19. Or other suitable methods of adjusting the length of lever 4 on either or both sides of the fulcrum may be employed. The opposite end of the lever 4 is shaped as shown, and is connected, by a combined knuckle and ball-and-socket joint 21, 22 (see Fig. 4), to the lower end of a vertically slidable counter-shaft 23, arranged parallel to the meter spindle, and carrying a gear-wheel or pinion 24 for transmitting motion from the said spindle to the train of the registering mechanism. The said meter spindle is adapted to be directly coupled to a spindle 25 having keyed to it a toothed compensating wheel 26, suitably dimensioned to provide for the full range of compensating action, but having at a portion of its periphery, a plain or toothless area 27, which may be either of the form shown in Figs. 1 and 3, in which the teeth upon the one side are of gradually increasing length, from top to bottom ends of the wheel; or, as shown in Fig. 8, where the said plain area is of a triangular shape, the teeth being of gradually decreasing length upon both sides.

The countershaft 23, which can turn in bearing brackets 28 carried by the frame, is surrounded by the sleeve 29, confined between the brackets 28, and carrying the spur wheel 30. Driving connection between the sleeve and the shaft 23 is made by a pin 31 upon the latter engaging with a slot 32 in the said sleeve. By this means the wheel 24 and countershaft 23 can be raised and lowered, by the action of the aneroid, without altering the position of the wheel 30, and without interfering with the drive thereto. The said wheel 30 meshes with a corresponding wheel 33 upon the end of a worm 34 engaging with a worm wheel 35 which is directly geared to the registering train. Thus, motion from the meter spindle to the registering train is transmitted from the compensating wheel 26, through pinion 24, countershaft 23, sleeve 29, and wheel 30 to the worm gear. The parts are so arranged that when the aneroid 1 is influenced by the minimum supply-pressure, the pinion 24 meshes with the lower end of the compensating wheel 26 where the plain area 27 is widest, as shown in Fig. 1, so that whereas the meter spindle and compensating wheel rotate continuously while the meter is at work, the motion transmitted to the countershaft and registering mechanism is interrupted during each rotation of the spindle by a pause, which lasts until the widest part of the interrupted area has passed by the countershaft pinion. During this pause the countershaft 23 is necessarily stationary, and no registering action takes place, although gas at minimum pressure is still being delivered, but on the pressure increasing, or when the meter is applied to a service where the pressure is higher than the minimum pressure for which the mechanism is calibrated, then by the action of the gas on the aneroid 1, the latter is compressed and the corresponding end of the lever 4 pulled down, the opposite end being thereby raised and lifting the countershaft 23. The wheel 24 is now brought opposite to a narrower part of the interrupted area 27 of the compensating wheel 26, so that the pause which occurs in the transmission of the spindle motion to the registering mechanism is reduced in proportion to the increase of pressure, and thus the registering action is continued during a proportionally increased part of each revolution of the meter spindle. On the other hand, when the supply pressure drops, the mechanism adjusts itself to the new conditions by the counter-shaft pinion 24 being drawn downward, by the action of the lever 4, into a position where the interruption in its rotation will be longer in proportion to the decrease of pressure, thus retarding the registering action.

In order to give an indication of the pressure prevailing, the end of the lever 4 carries an arm 36 provided with a pin 37 engaging with a slot 38 in the lower end of a vertical indicator bar 39 sliding within guides 40 over the face of the front dial plate 41, and carrying a pointer 42 that moves over the face of a graduated scale 43 as the pressure rises and falls.

In the modification shown in Fig. 9, another form of variable gearing is employed for varying the rate of motion of the registering train in proportion to the pressure variations. This gearing is of the friction type and comprises a pair of reversed coned change-speed drums or pulleys 44, 45 mounted respectively on a shaft 25 connected with the meter spindle, and on a countershaft 23 of the metering train. The said pulleys are geared together by a belt 46 which is connected through a belt-shifting device 47, to the end of the rocking lever 4 controlled by the aneroid. Thus, as the pressure of the gas rises and falls, so the belt 46 is shifted along the pulleys so as to vary the rate at which motion is transmitted from the meter spindle to the registering train. For an increase of pressure the belt is raised so as to accelerate the registering action, while when it falls the said belt is lowered, so as to retard the registering action.

Instead of the elastic member consisting of an aneroid, as above described, it may consist of a curved flat tube, as shown at 1ᵃ in Fig. 10, similar to that used in steam and other pressure gages, and which tends to straighten out as the pressure rises, and to thereby raise the end of the lever 4 which controls the compensating gearing, said tube being connected with the lever by a pin and slot arrangement, as shown and described. The parts 10, 11, and 12, previously described, are used as the mounting for the tube 1ᵃ and in fact, except for the provision of said tube, the construction is the same as that which has been described.

It will be understood that no specific description herein contained is intended to put any limitation upon the scope of the appended claims which would not otherwise inhere therein.

Having fully described our invention, what we desire to claim and secure by Letters Patent is:—

1. In a gas meter registering mechanism, the combination with the registering train and the meter spindle, of a step-wise mutilated gear driven by the spindle, a vertical countershaft, a pinion mounted on the countershaft to mesh with said step-wise mutilated gear, a sleeve surrounding the countershaft and held against axial movement, a pinion carried by the sleeve and meshing with the registering train, a connection between the sleeve and the countershaft to provide for the latter having sliding movement with relation to the sleeve and to couple the countershaft and the sleeve for rotation, a rocking lever connected with the countershaft to cause the sliding movements of the latter, and an expansible and contractible chamber subject to the pressure of the gas in the meter and operatively connected to the rocking lever.

2. In a gas meter registering mechanism, the combination with the registering train and the meter spindle, of variable transmission gearing interposed between said spindle and said train and including a reciprocatory controlling element, an oscillatory lever for effecting operative movements of the element, an expansible and contractible chamber subject to the pressure of the gas in the meter, the chamber being supported from the base of the meter and being provided at its lower end with a stud, the said base having a slot into which the stud projects and which provides for longitudinal adjustments of the position of the chamber, and an operative connection between the chamber and the lever, the connection being adjustable with relation to the lever in accordance with the adjustment of the chamber with relation to the base.

3. In a gas meter registering mechanism, the combination with the registering train and the meter spindle, of variable transmission gearing interposed between said spindle and said train and including a reciprocatory controlling element, an oscillatory lever for effecting operative movements of the element, an expansible and contractible chamber subject to the pressure of the gas in the meter, means for supporting the chamber and providing for adjustments of the position thereof, and an operative connection between the chamber and the lever, the connection being adjustable with respect to the lever in accordance with adjustments of the position of the chamber.

In testimony whereof we have hereunto set our hands in presence of two subscribing witnesses.

WILLIAM DONALD CHESHIRE.
EDMUND DOUGLAS WEIPPERT.

Witnesses:
HENRY SKERRETT,
HENRY NORTON SKERRETT.